(12) United States Patent
Byres et al.

(10) Patent No.: US 9,043,868 B2
(45) Date of Patent: *May 26, 2015

(54) NETWORK SECURITY APPLIANCE

(71) Applicant: Byres Security, Lantzville (CA)

(72) Inventors: Eric Byres, Lantzville (CA); Darren Lissimore, Coquitlam (CA); John Karsch, Vancouver (CA); Khai Lee, Vancouver (CA)

(73) Assignee: BYRES SECURITY, Lantzville (CA)

( * ) Notice: Subject to any disclaimer, the term of this patent is extended or adjusted under 35 U.S.C. 154(b) by 129 days.

This patent is subject to a terminal disclaimer.

(21) Appl. No.: 13/774,888

(22) Filed: Feb. 22, 2013

(65) Prior Publication Data

US 2013/0232338 A1 Sep. 5, 2013

Related U.S. Application Data

(63) Continuation of application No. 13/274,105, filed on Oct. 14, 2011, now Pat. No. 8,407,758, which is a continuation of application No. 11/544,019, filed on Oct. 5, 2006, now Pat. No. 8,042,147.

(60) Provisional application No. 60/723,902, filed on Oct. 5, 2005.

(51) Int. Cl.
*H04L 29/06* (2006.01)
*H04L 9/00* (2006.01)
(Continued)

(52) U.S. Cl.
CPC ......... *H04L 63/0428* (2013.01); *H04L 41/0213* (2013.01); *H04L 41/0806* (2013.01); *H04L 41/0893* (2013.01); *H04L 43/10* (2013.01);
(Continued)

(58) Field of Classification Search
None
See application file for complete search history.

(56) References Cited

U.S. PATENT DOCUMENTS 5,583,793 A 12/1996 Gray et al.
6,735,702 B1 * 5/2004 Yavatkar et al. ................ 726/13
(Continued)

FOREIGN PATENT DOCUMENTS

DE 101 38 865 2/2003
EP 0 986 229 8/1999
(Continued)

OTHER PUBLICATIONS

3Com Corporation, 3Com Embedded Firewall Solution Data Sheet, 2002, pp. 1-5.
(Continued)

*Primary Examiner* — Christopher Revak
(74) *Attorney, Agent, or Firm* — Foley & Lardner LLP; Christopher J. McKenna; Daniel E. Rose

(57) ABSTRACT

Methods, devices, and systems that may be used to secure networked devices are provided. One method includes receiving, at a security device, encrypted configuration data from a management server connected to a data network, from packets addressed to a networked device. The method further includes managing, by the security device, packets between the networked device and other devices accessible through a network based upon the configuration data. The method further includes sending, by the security device, a plurality of encrypted heartbeat messages to the management server utilizing an address associated with the networked device as the originating address for packets in which the encrypted heartbeat messages are transmitted.

26 Claims, 15 Drawing Sheets

(51) Int. Cl.
*H04K 1/00* (2006.01)
*H04L 12/26* (2006.01)
*H04L 29/08* (2006.01)
*H04L 12/24* (2006.01)

(52) U.S. Cl.
CPC ......... *H04L 63/0218* (2013.01); *H04L 63/0263* (2013.01); *H04L 67/34* (2013.01); *H04L 67/303* (2013.01); *H04L 67/125* (2013.01); *H04L 67/12* (2013.01); *H04L 67/28* (2013.01)

(56) References Cited

U.S. PATENT DOCUMENTS

| | | | |
|---|---|---|---|
| 6,823,383 | B2 | 11/2004 | MacBride |
| 6,970,068 | B1 | 11/2005 | Pugel et al. |
| 7,176,791 | B2 | 2/2007 | Sakaki et al. |
| 7,240,102 | B1 | 7/2007 | Kouznetsov et al. |
| 7,246,156 | B2 | 7/2007 | Ginter et al. |
| 7,587,763 | B2 | 9/2009 | Yodaiken |
| 7,603,431 | B2 | 10/2009 | Campbell et al. |
| 8,042,147 | B2 | 10/2011 | Byres et al. |
| 8,407,758 | B2 * | 3/2013 | Byres et al. ............ 726/1 |
| 2002/0069365 | A1 | 6/2002 | Howard et al. |
| 2002/0099958 | A1 | 7/2002 | Hrabik et al. |
| 2002/0124187 | A1 * | 9/2002 | Lyle et al. ............ 713/201 |
| 2002/0194495 | A1 * | 12/2002 | Gladstone et al. ............ 713/200 |
| 2003/0051155 | A1 | 3/2003 | Martin |
| 2003/0139821 | A1 | 7/2003 | Papadopoulos et al. |
| 2003/0140248 | A1 | 7/2003 | Izatt |
| 2003/0229779 | A1 | 12/2003 | Morais et al. |
| 2003/0233573 | A1 | 12/2003 | Phinney |
| 2004/0139350 | A1 | 7/2004 | Lyon et al. |
| 2004/0260943 | A1 | 12/2004 | Piepiorra et al. |
| 2005/0005093 | A1 | 1/2005 | Bartels et al. |
| 2006/0002292 | A1 * | 1/2006 | Chang et al. ............ 370/225 |
| 2007/0006292 | A1 | 1/2007 | Jaenicke |
| 2007/0038872 | A1 | 2/2007 | Bridges et al. |
| 2009/0183254 | A1 | 7/2009 | Franco et al. |
| 2009/0327695 | A1 | 12/2009 | Molsberry et al. |
| 2010/0188975 | A1 | 7/2010 | Raleigh |
| 2010/0188990 | A1 | 7/2010 | Raleigh |
| 2010/0188992 | A1 | 7/2010 | Raleigh |
| 2010/0191575 | A1 | 7/2010 | Raleigh |
| 2010/0191846 | A1 | 7/2010 | Raleigh |
| 2010/0191847 | A1 | 7/2010 | Raleigh |

FOREIGN PATENT DOCUMENTS

| | | |
|---|---|---|
| EP | 1 024 627 | 1/2000 |
| EP | 1 414 216 | 10/2003 |
| WO | WO-03/015369 | 2/2003 |
| WO | WO-2004/071047 | 8/2004 |
| WO | WO-2005/033829 A2 | 4/2005 |
| WO | WO-2007/038872 | 4/2007 |

OTHER PUBLICATIONS

BCIT Group for Advanced Information Technology, "Good Practice Guide on Firewall Deployment for SCADA and Process Control Networks—Policy and Best Practice ID. 00157", National Infrastructure Coordination Centre, UK, Feb. 15, 2005 pp. 1-36.
E.J. Byres and A. Creery; "Industrial Cybersecurity for Power System and SCADA Networks", Proceedings of the IEEE Petroleum and Chemical Industries Conference, Institute of Electrical and Electronics Engineers, Denver, pp. 1-7.
E.J. Byres and M. Franz, "Finding the Security Holes Before the Hackers Do", ISA Technical Conference, Instrumentation Systems and Automation Society, Chicago, Oct. 2005 pp. 1-9.
Extended European Search Report issued Apr. 22, 2013 in European Patent Aplication No. 06790799.8, 4 pages.
Innominate Security Technologies AG, EAGLE mGuard, The integrated solution for industrial Ethernet networks.
Innominate Security Technologies AG, Inominate mGuard smart, The all-in-one security for protecting business critical communication.
International Preliminary Report on Patentability for PCT Application No. PCT/CA2006/001639, issued Apr. 8, 2008, 6 pages.
International Search Report for PCT Application No. PCT/CA2006/001639, mailed Jan. 31, 2007, 3 pages.
MadHat Unspecific Simple Nomad, SPA: Single Packet Authorization, Black Hat Briefings, pp. 1-10, Las Vegas, Jul. 23-28, 2005.
Michael Rash, Advances in Single Packet Authorization, Jan. 14, 2006, Enterasys Networks, Inc., pp. 1-31.
Sabastien Jeanquier, An Analysis of Port Knocking and Single Packet Authorization, Sep. 9, 2006, MSc Thesis, Royal Holloway, University of London, pp. 1-76.
Sotiris Ioannidis, Angelos D. Keromytis, Steve M. Bellovin and Jonathan M. Smith, Implementing a Distributed Firewall, 2000, pp. 1-10.
Written Opinion of the International Searching Authority for PCT Application No. PCT/CA2006/001639, mailed Jan. 31, 2007, 5 pages.

* cited by examiner

NETWORK SECURITY APPLIANCE

CROSS-REFERENCE TO RELATED APPLICATIONS

This application is a continuation of U.S. patent application Ser. No. 13/274,105 (issued as U.S. Pat. No. 8,407,758), filed Oct. 14, 2011, which is a continuation of U.S. patent application Ser. No. 11/544,019 (issued as U.S. Pat. No. 8,042,147), filed Oct. 5, 2006, which claims the benefit of U.S. Provisional Patent Application Ser. No. 60/723,902, filed Oct. 5, 2005, all of which are hereby incorporated by reference in their entireties.

TECHNICAL FIELD

The present invention relates to industrial network security and more particularly to network security appliances and to methods of deploying and managing such appliances to secure industrial devices.

BACKGROUND

Supervisory Control and Data Acquisition (SCADA) and automation control equipment used in the management of critical industrial systems such as electricity generation and distribution, oil production, transportation, manufacturing and health services has become increasingly interconnected through the use of popular communications technologies such as Ethernet, TCP/IP and web services. While the networking of SCADA and automation control equipment has brought considerable benefit in the form of improved information flows and efficiency, it has also exposed these systems to the possibility of attack from viruses, hackers and terrorists as once isolated devices and networks become accessible from around the world. Currently there numerous poorly protected control devices spanning the globe. These are charged with the safe operation of critical systems and infrastructure such as power transmission substations, gas pipelines, manufacturing plants and the like, yet at the same time remain largely unprotected from malicious persons who may target them for attack.

Traditional security solutions are based on central firewalls protecting unsecured internal devices or computers from the outside world, a design that cannot address the requirements of the industrial controls world. Existing controllers do not offer authentication, integrity or confidentiality mechanisms and can be completely controlled by any individual that can find or "ping" the network and the associated devices. In addition, they cannot be easily patched or have security features added to them. Once a virus or hacker manages to get past (or is already inside) the traditional firewall, the devices protected by the firewall, such as a typical programmable logic controller (PLC) or distributed control system (DCS) is an easy target for attack.

In many industrial environments, such as oil pipelines or electrical distribution systems, there can be hundreds of controller devices distributed across a wide geographic area, including very remote locations. Personnel with the skills to manage a traditional security device are often unavailable in these remote locations, so that devices that require even minor amounts of local configuration are unacceptable. For example, current firewall products that offer "transparent" operation still require the local configuration of network properties (such as IP address, gateway and network mask) or they are not remotely manageable, a serious shortcoming in the SCADA world. As well, since there are large number of separate locations in these distributed control systems (each requiring a firewall), there is a need for techniques for simultaneous management of hundreds of firewalls from a central location, ruling out the use of popular small office firewall solutions that are managed on a "one-by-one" basis.

Complicating the problem is that there are thousands of different makes and models of industrial control devices on the market, each communicating using one or more of the over 350 known SCADA communications protocols. Each control device needs very specific security rules to be protected correctly—for example, one popular PLC has an unusual but well-known security issue with web requests that contain URLs longer than 125 characters. Manually creating the separate rules in a traditional firewall for each protected devices' individual vulnerabilities causes the overall firewall configuration to be exceedingly complex and chance of introducing errors in the configuration is high.

Finally, the staff operating and maintaining these SCADA systems are, by necessity, highly trained control systems specialists and not information technology or security specialists. Thus the management of these security systems need to be based on a new paradigm that is understandable to the control technician, rather than the traditional network technology focused management and configuration of network systems. Without control technician and control product focused solutions, serious flaws are likely to occur in the setup and management of any security solution.

Accordingly, there is a need for a network security appliance for SCADA and automation control equipment that can be easily deployed and is remotely manageable and facilitates protection of network enabled control devices in widely distributed industrial environments.

SUMMARY

One embodiment of the disclosure relates to a method including receiving, at a security device, encrypted configuration data from a management server connected to a data network, from packets addressed to a networked device. The method further includes managing, by the security device, packets between the networked device and other devices accessible through a network based upon the configuration data. The method further includes sending, by the security device, a plurality of encrypted heartbeat messages to the management server utilizing an address associated with the networked device as the originating address for packets in which the encrypted heartbeat messages are transmitted.

Another embodiment relates to a device including a processor and a heartbeat module executable by the processor for transmitting a packet providing a status signal to a management server in a network, utilizing an address associated with one of one or more networked devices as an originating address for the packet. The device further includes one or more security modules executable by the processor, the one or more security modules managing data transmitted between the one or more networked devices and other devices on the network based upon one or more security profiles associated with the one or more networked devices.

Another embodiment relates to a system including a plurality of nodes. Each node is associated with one or more of a plurality of networked devices. Each node transparently bridges the one or more associated networked devices to a network and provides management of data communications traversing to and from the one or more associated networked devices and other devices in the network based upon security profiles associated with attributes of the one or more associated networked devices. The plurality of nodes are configured to communicate with a management server by utilizing an address of one of the associated networked devices, and the plurality of security devices are configured to send a status message to the management server utilizing address information of an associated networked device as a source of the status message.

Other aspects and features of the present invention will become apparent to those ordinarily skilled in the art upon review of the following description of specific embodiment of the invention in conjunction with the accompanying figures.

BRIEF DESCRIPTION OF THE DRAWINGS

Further features and advantages of the present invention will become apparent from the following detailed description, taken in combination with the appended drawings, in which:

FIG. 4b is a logical view of the deployment topology shown in FIG. 4a;

It will be noted that throughout the appended drawings, like features are identified by like reference numerals.

DETAILED DESCRIPTION

Figure 1:
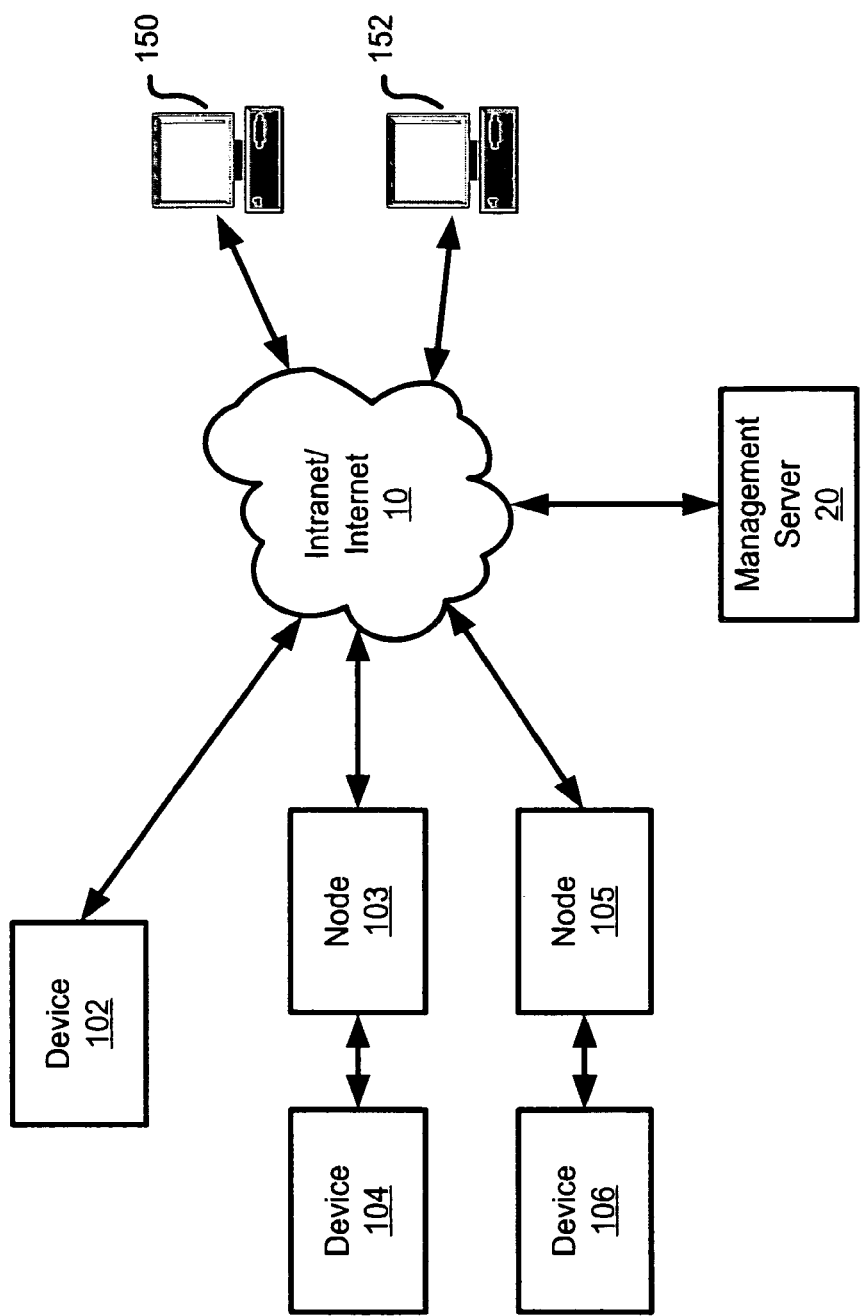
FIG. 1 illustrates a deployment topology of a security appliance in serial with a device.

Embodiments of the present invention are described below, by way of example only, with reference to FIGS. 1-16.

Ensuring network security of industrial device has become increasing of concern. An endpoint device includes any network enabled device such as computing devices, industrial process equipment (such as intelligent measurement devices), industrial control equipment (such as PLCs—programmable logic controllers, RTUs—remote telemetry/terminal units, IEDs—intelligent electronic devices and DCS—Distributed Control Systems), medical devices and the like. For example, in SCADA (Supervisory Control And Data Acquisition) systems, an RTU (Remote Terminal Unit) is a device installed at a remote location that collects data, codes the data into a format that is transmittable and transmits the data back to a central station, or master. An RTU also collects information from the master station and implements processes that are directed by the master. RTUscan be equipped with input channels for sensing or metering, output channels for control, indication or alarms and a communications port.

SCADA and automation control systems are generally computer systems for gathering and analyzing real time data and controlling industrial processes. SCADA systems can be used to monitor and control a plant or equipment in industries such as telecommunications, water and waste control, energy, oil and gas refining and transportation. A SCADA system gathers information, such as the pressure profile along a pipeline, transfers the information back to a central site, alerting the master station that the pressures might be above or below safe limits, carrying out necessary analysis and control, such as determining if the situation is critical, and displaying the information in a logical and organized fashion.

In order to protect an endpoint device, a network security appliance or security node can be serially deployed in the upstream path from an endpoint device which requires protection such as firewalling, intrusion detection, antivirus scanning, etc. The security node has no IP address, thereby simplifying configuration and making it difficult to directly attack the node. Traffic generated by the security node appears to come from one of the endpoint devices it is protecting as the security node assumes the IP address of the device. As the security node utilizes existing device addresses at the layer 2 and layer 3 level to communicate with the management server, remapping of device addresses by common IP addressing solutions used in traditional firewalls such as through dynamic addressing via Dynamic Host Configuration Protocol (DHCP) assignment or static addressing through manual configuration is not required.

The security node can be managed from anywhere in the control or SCADA network, or through interconnected networks provided that the management server can deliver a message to anyone of the endpoint devices to be protected. Management of the security node is performed by a secure management connection protocol. During a management server connection to the security node, only encrypted traffic to/from the management server is permitted in or out of the node. All traffic leaving the node is altered to appear as if it is from an endpoint device the node is protecting. In particular, if an attacker doesn't have all of the information required to establish a connection, they won't even know the node is there.

The security node is applicable to any protocol that can run over top of the Internet Protocol (IP). Specific applications protocols can range from: hypertext transfer protocol (HTTP) (for viewing the device to be protected via a web browser); file transfer protocol (FTP) (for sending the device data files); Ethernet/IP, MODBUS, DNP3, ICCP, OPC (all common SCADA and PLC protocols) and IEEE P1073 Medical Information Bus. The security node passively collects information on the traffic transiting between the endpoint device and other devices or computers in the network and can provide this information to the management server.

The security nodes provides a means for detecting, establishing and maintaining a secure communication link between a node (a network security appliance) and a management server while keeping the node itself undetectable in a network. This secure link can utilize a variety of proven security protocols such as SSL or IPSec. The security node permits effective deployment with no configuration required by a local operator or node installer. As described, no reconfiguration of IP addresses of the various nodes and/or endpoint devices is required. The functionality of a network security appliance is remotely configured by a management server, in a secure manner.

To enable remote configuration, the management server system responsible for managing the node's policies and settings is able to communicate over a network to at least one of the devices that the node will be protecting. The security node device policy can be setup on a management server in advance of the node deployment, and will be downloaded by the node when the node is connected to the network and powered on. This policy download minimizes the time that the device spends in a pass-through or learning state. However, it is also possible to secure and deploy the nodes before the management server is configured. Initial deployment security settings are specific to the location and settings of the network where the appliance is deployed. Alternatively the security nodes may determine independently the nature of the devices being protected and automatically implement some basic security functions prior to connection with the management server.

The encrypted heartbeat mechanism allows many (e.g., thousands) of nodes to report back to a single management server. The heartbeat mechanism is useful in bandwidth-restricted systems common in SCADA environments. The heartbeat mechanism sends just enough information back to the management server to report the current status and conditions for each security application installed on the node. The amount of reported information can also be controlled remotely via adjustment of security node's heartbeat settings. This heartbeat mechanism also avoids the network traffic load issues common to polling-based management systems such as the simple network management protocol (SNMP) Report by exception is used for reporting exceptional events to the management server. These types of events would include attack reports, critical system settings being reached, and other issues where the management server should know immediately that something has occurred. Each security node's heartbeat module can be setup with its own set of encryption keys. Upon reception of the heartbeat data, the source is determined and the appropriate decryption done on the management server monitor station. For increased scalability, clusters of monitoring stations can be used.

FIG. 1-4 depict multiple deployment topologies of network security appliances. Shown in FIG. 1, various endpoint devices 102, 104, and 106 are connected to a network 10. Computers, 150 and 152, or other management or monitoring devices, send and receive data from the endpoint devices through the network 10. The network 10 may be a control network, an intranet network or the Internet, utilizing various network routing protocols such as the Internet Protocol (IP). Security nodes, 103 and 105, as shown in the figures and described, represent network security appliances that provide security and firewall type functionality for endpoint devices connected to the network. As shown in FIG. 1, device 102 is an unprotected device which is exposed to potential attack, whereas devices 104 and 106 have security nodes 103 and 105 serially associated in the communications path with them respectively. Therefore all communications to and from the device must transit the associated security node, the security node at the basic level operating as a bridge from the device to the network.

A management server 20 can be connected to the same network as the security nodes 103 and 105 or may be interconnected by one or more networks through network 10. The management server 20 provides management and control capability to the security nodes in the network.

Figure 2:
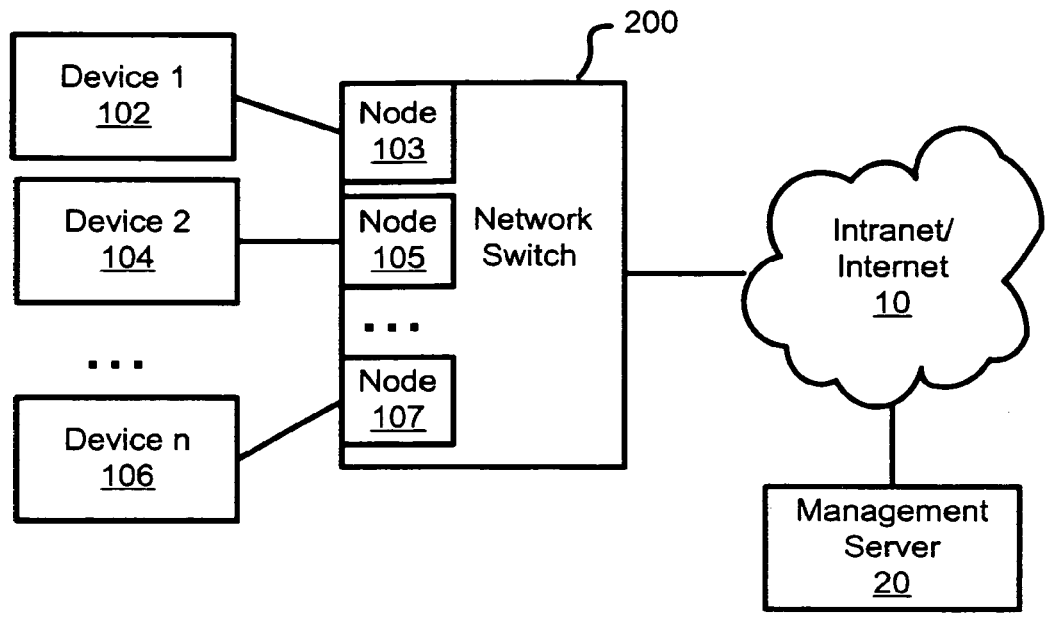
FIG. 2 illustrates a deployment topology of multiple security appliances integrated in a network switch.

FIG. 2 shows an example where the device 102, 104 to 106 are interconnected by a network switch 200 which host individual security nodes 103, 105 to 107. The network switch in essence represents a sub-network hosting multiple devices.

Figure 3:
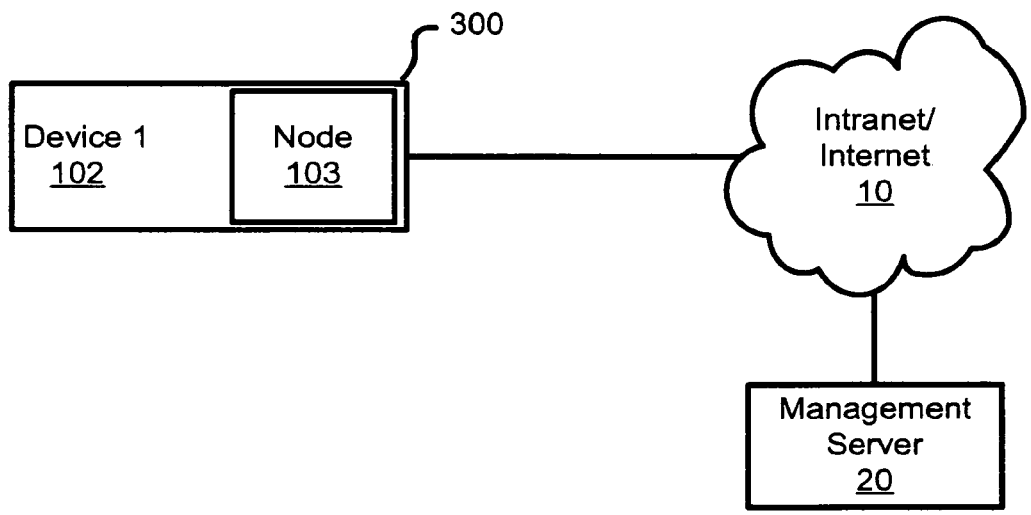
FIG. 3 illustrates a deployment topology of a security appliance integrated with a device.

FIG. 3 depicts an integrated device and security node 300. In this example the security node 103 may be integrated in the same packaging as device 102. Depending on the architecture of the overall device 300, hardware and software may be shared between the actual device functions and the security node functions. For operational purposes, the security node would still operate in an independent manner from the device 102.

Figure 4A:
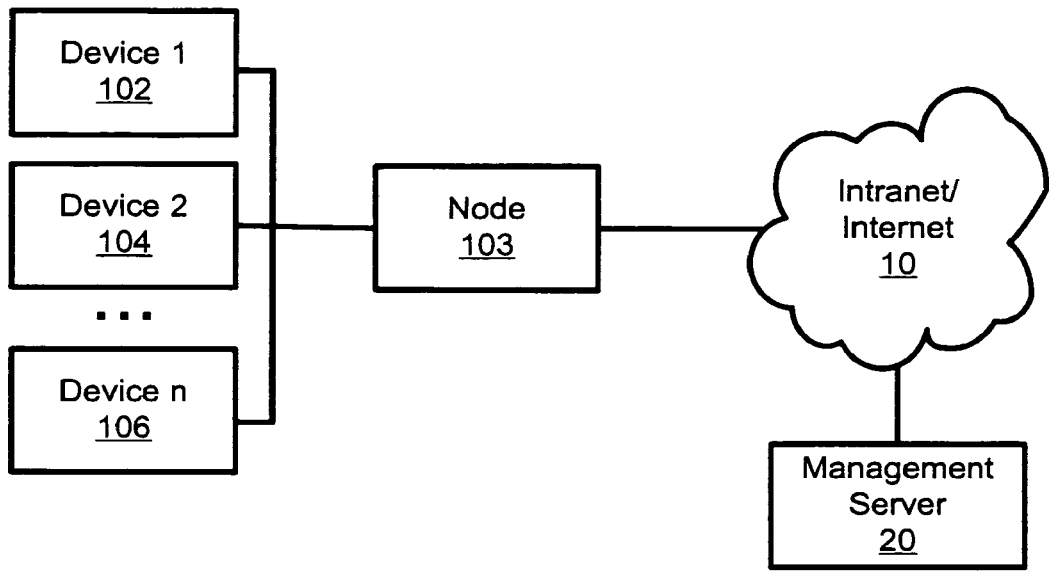
FIG. 4a illustrates a deployment topology of security appliance protecting multiple devices.
Figure 4B:
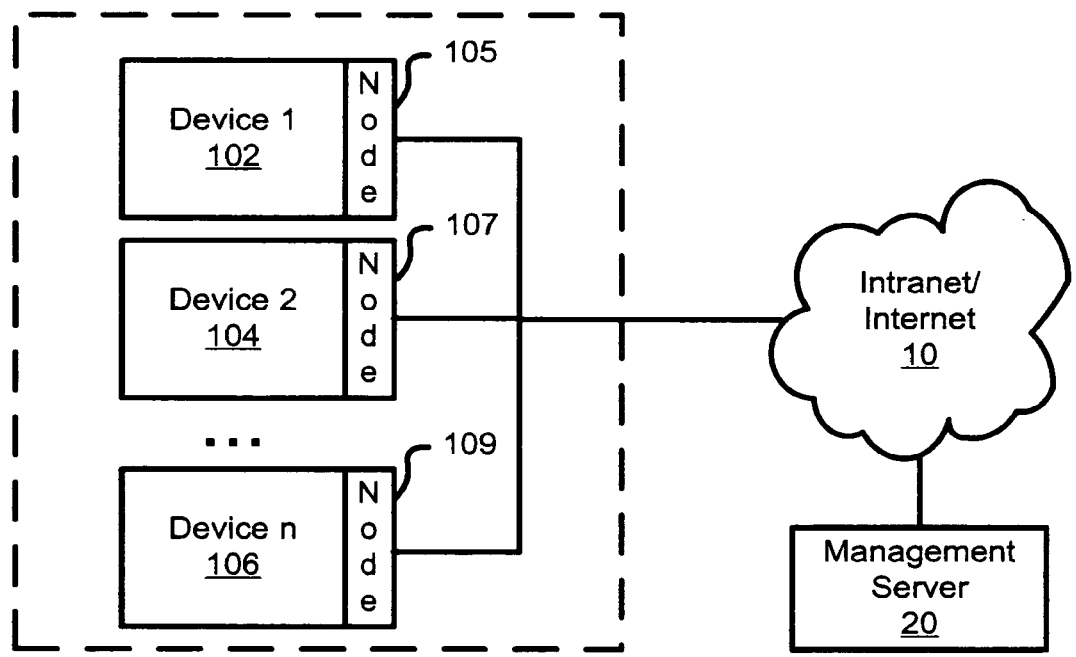

FIGS. 4a and 4b depicts multiple devices, 102, 104 and 106 being protected by a single security node 103. In FIG. 4a the security node 103 physically protects and interconnects multiple devices. The security node 103 may have an integrated hub, switch or router, or it may be separate from the actual security node 103, for distributing data traffic to the associated device. As shown in FIG. 4b, security node 103 would appear to provide separate protection for each device 102, 104 and 106 by providing separate instances of security nodes 105, 107 and 109 respectively. The security node 103 can provide unique protection for each device downstream. The management server 20 can administer management of the devices independently if required.

Figure 5:
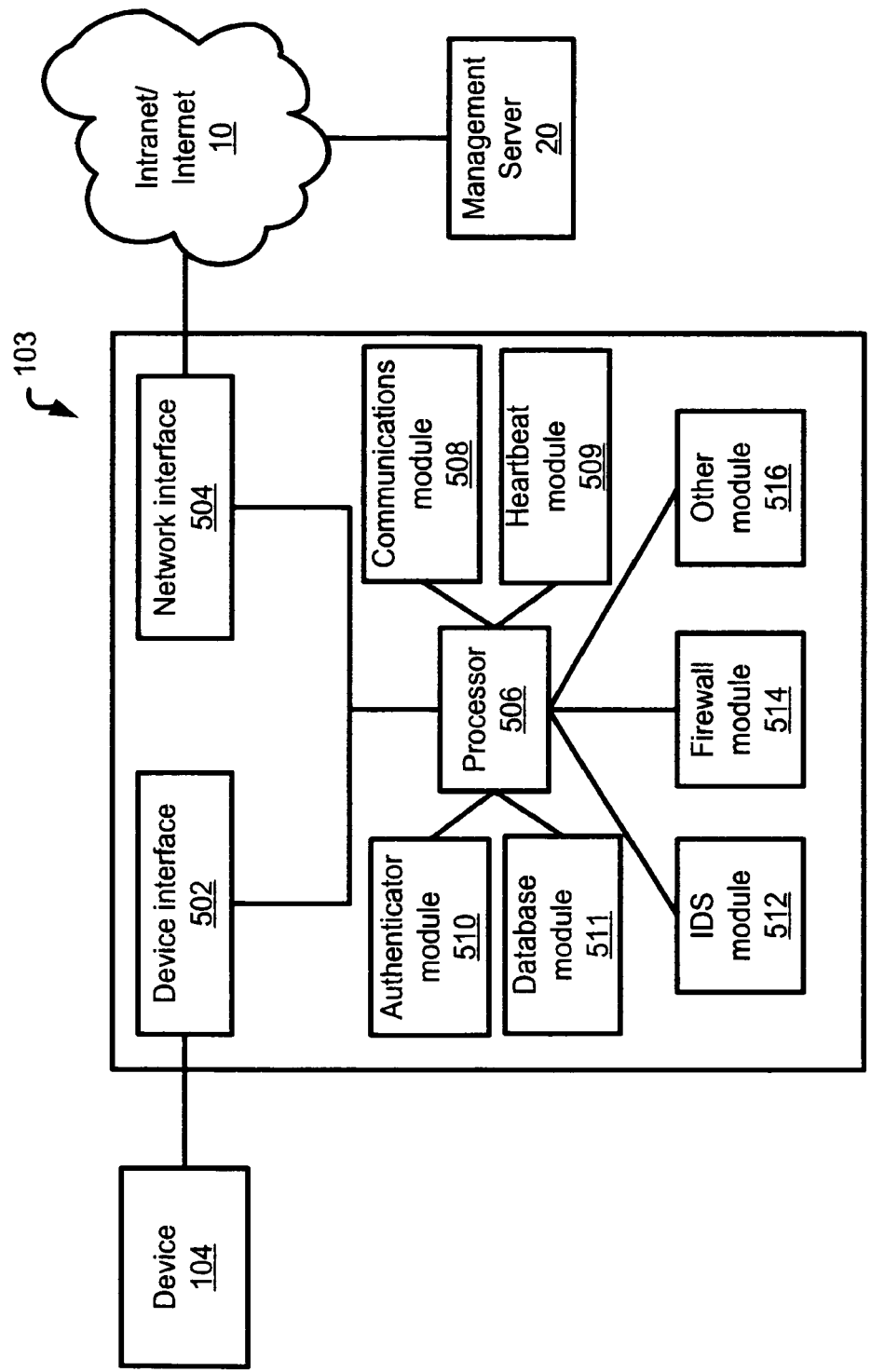
FIG. 5 illustrates an security appliance in block diagram form.

FIG. 5 shows the modules of a security node 103. A device interface 502 connects the security node to the endpoint device 104 being protected. A network interface 504 connects the security node to the network side. Standard protocol and physical level processing such as for example Ethernet PRY management can be performed by these interfaces. A processor 506 is utilized to process the traffic passing through the device interface 502 and the network interface 504. Depending on the operational state of the security node 103, the processor may perform a number of functions by interacting with the other modules of the node. The communications module 508 is utilized in establishing a secure management connection with the management server 20. The authenticator module 510 maintains information utilized in the authentication of credentials exchanged between the security node and the management server. The database module 511 is utilized for maintaining device profiles of the devices that the security node is protecting and a database of the known talkers, i.e. external devices that are in communication with devices being protected. The heartbeat module 509 sends period heartbeats to the management server 20. In the case of an exception event such as an intrusion attempt or the discovery of a new device an exception heartbeat can be sent to notify the management server 20 and ensure appropriate action is taken.

When the security node 103 is in the operational state, various security modules can be utilized to manage network traffic. For example an intrusion detection module 512 monitors traffic to determine if there is a malicious attempt to gain access to the device 104 and enacts appropriate procedures for logging and denying access. Similarly the firewall module 514 provides firewall capability that can be tailored to the specific device 104 vulnerabilities. Additional modules such as module 516 can be deployed in the security node 103 than may provide various functionality: such as device identification, virtual private networking (VPN), network statistics gathering, bandwidth monitoring and traffic shaping etc.

During secure communications with the management server the communications module provides details regarding the traffic observed by the security node 103 and can request software updates to the modules 512, 514 and 516. The remotely deployable software modules, as well as configurations and commands for these modules can be securely dispatched to the security node 103 via a secure connection to the communications module 508 from the management server 20 across the network 10. New or updated modules, 512, 514 and 516 can be deployed via a secure communications link.

To enable the security nodes to have no defined network address, each node can use a stealth IP addressing scheme where no Internet Protocol (IP) address is assigned to the node (not even a trivial one such as 0.0.0.0 or 192.168.1.1). A node achieves this by borrowing an IP address from one of the endpoint devices it is protecting and using it for configuration and management communications. As a result, all traffic generated by the node will appear to come from one or more of the downstream endpoint devices and can not be traced back to the node, making it both invisible and simple to configure. In addition the security node can assume layer 2 identity such as media-access-control (MAC) addresses of the device to ensure stealth capability.

Figure 6:
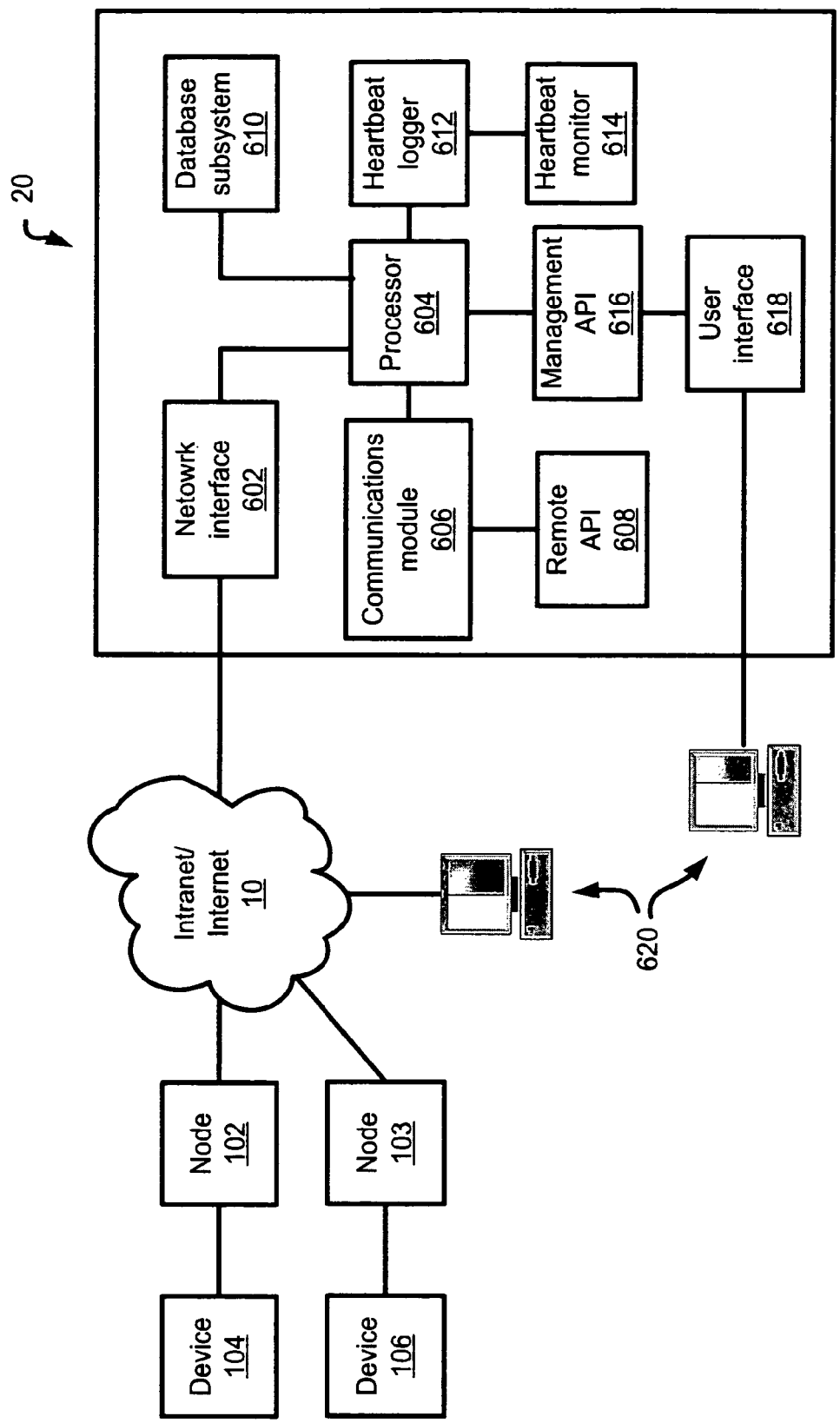
FIG. 6 illustrates a management server in block diagram form.

FIG. 6 shows the modules of a management server 20. The management server has a network interface 602 for receiving and transmitting traffic to security nodes under management. The management server can administer any number of security nodes across multiple networks. A processor 604 receives and sends traffic through the network interface 602. The processor 604 interacts with a communications module 606 and remote application programming interface 608 for establishing connections with the security nodes in the networks. A database subsystem 610 is utilized to store information on nodes in the network and profiles for specific device types. The profiles can then be downloaded to the appropriate nodes and the related security modules of the security nodes. A heartbeat logger module 612 logs the periodic heartbeat messages from the security devices on the network. Working in tandem with the heartbeat logger module 612 is a heartbeat monitor module 614, which checks the logged heartbeat data for error or caution conditions that require either automated action from the server or the management server operator's attention.

An interface to the management server 20 is abstracted as an management API 616 so that a variety of user interface systems 618 can be used for various interaction functions. The user interface systems 618 may include local graphical user interface (GUI) client, a command line interface (CLI) client or a secure web-server interface which can be directly accessed in the management system ore remotely access by a computer terminal 620 either directly connected or through the network 10.

Figure 7:
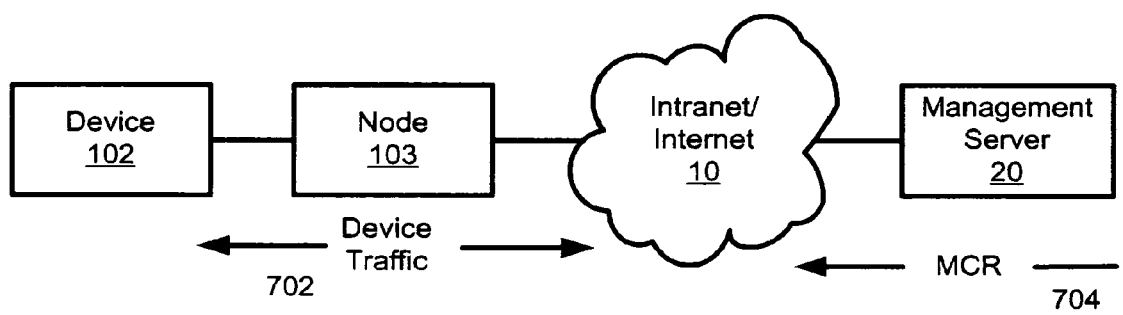
FIG. 7 illustrates a pre-initialization phase message flow.

FIG. 7 shows the messaging flow between the endpoint device 102 and the management server 20 during the pre-initialization phase. Prior to deployment and initialization of a node 103 there may or may not be unprotected bi-directional network traffic between a device 102 and other equipment on a network 10. If the node 103 is physically in place (but not initialized) it will allow traffic 702 to pass through. However, the node 103 will record the traffic for use in determining the types of devices it will be protecting. During this pre-initialization phase, a management server 20 will periodically send management connection request (MCR) packets 704 over the network 10, addressed to the device 102 that will eventually be protected by the node 103, but are intended to be intercepted by the node 103 as described in connection with FIG. 11.

Figure 8:
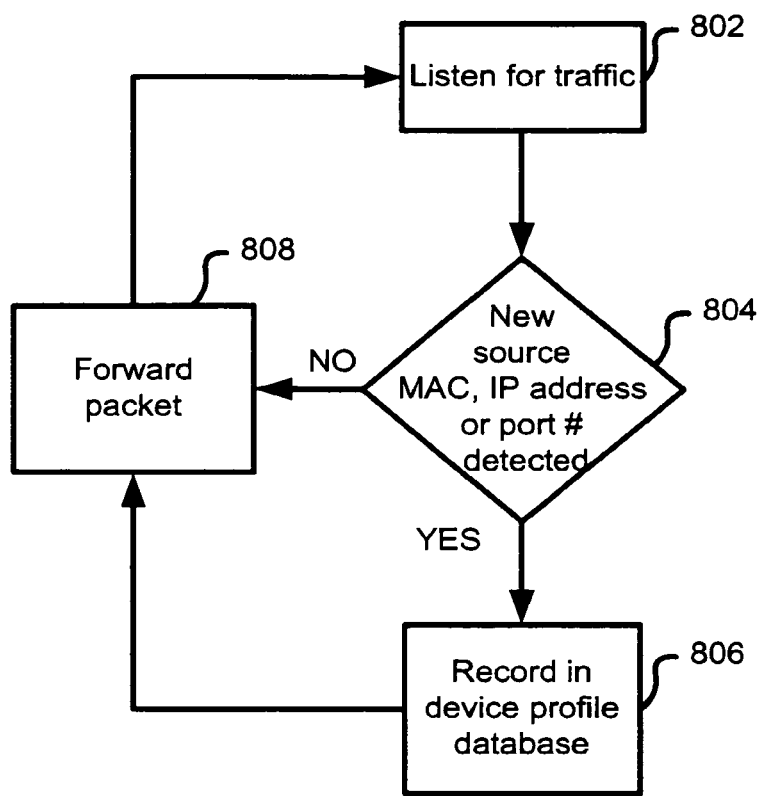
FIG. 8 illustrates a method of a learning mode in the security appliance on the device side.

FIG. 8 is a method diagram for the security node learning process based on traffic from the device side. When the node is initially installed and booted up, and is in the learning mode, the node determines the network information of the endpoint device(s) downstream that it will be protecting. All device traffic is transparently bridged during the learning phase and prior to configuration by the management server 20. The packets may be filtered by default firewall rules installed on the security node (in many situations there will be no firewall rules loaded at this stage, so no filtering will be done). The device information gathering is done in a passive manner and no network traffic is generated. In the startup state the security node monitors traffic originating from the device side at step 802. If the packet originates from a new source MAC, IP address or port number (YES at step 804), the device profile is recorded in a device profile database 806 resident in the security node. The packet is then forwarded onto the network at step 808. If the source of the packet is already known (NO at step 804) the packet is forwarded without modification to the device profile database. The learning mode can also operate during when the security node is configured and is in the operational phase to detect the addition anew devices. The learning mode may be operate at a lower execution priority or at period intervals when the security node is fully operational.

Figure 9:
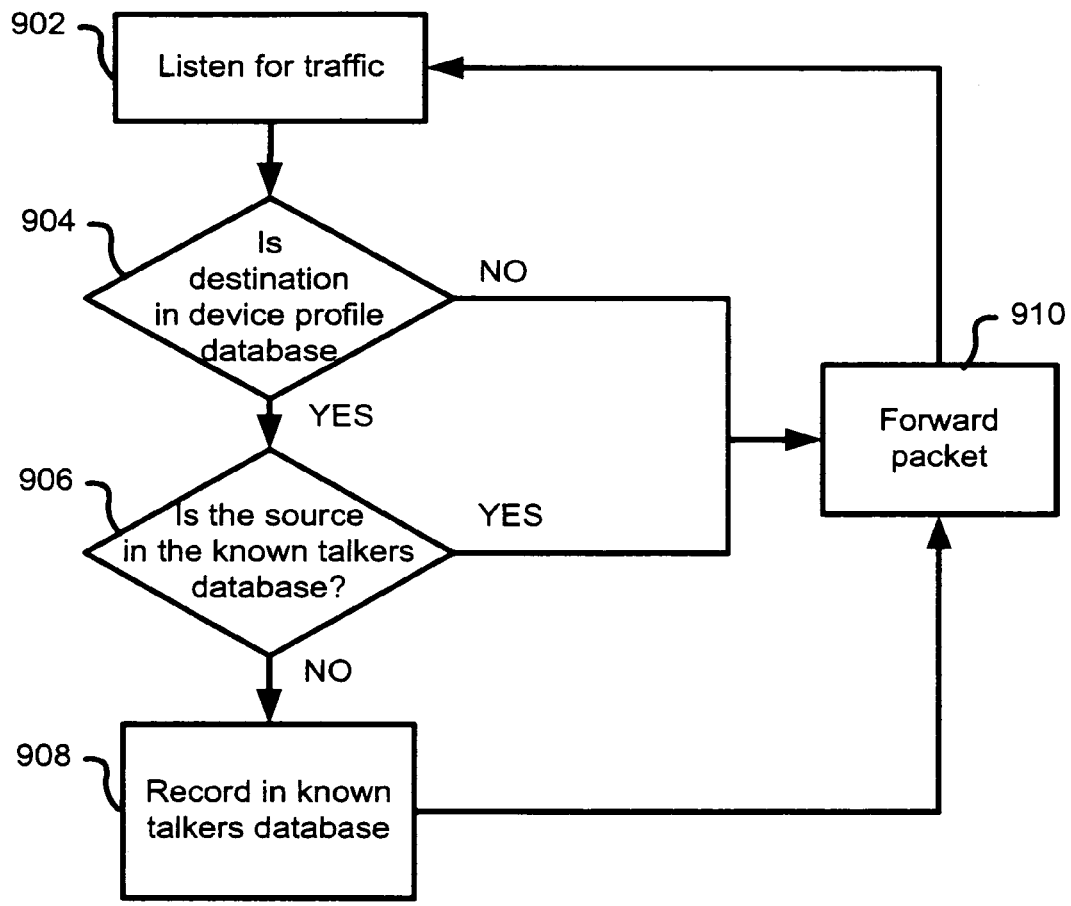
FIG. 9 illustrates a method of a learning mode in the security appliance on the network side.

Similar to the monitoring of traffic on the device side, the security node monitors traffic on the network side as well. FIG. 9 is a method diagram of the security node learning process on the network side. Incoming packets are monitored at step 902. If the destination address is not in the device profile database, (NO at step 904) the packet is forwarded on to the device interface at step 910. If the destination device is in the device profile database (YES at 904), the source of the traffic is determined at step 906. If the source is in the known talkers database (YES at 906), stored in the security node database module 511, the packet is forwarded at step 910. If the device is not in the known talkers database (NO at step 906) the source information is recorded at step 908 and then the packet is forwarded at step 910.

The step of forwarding the packet at step 808 of FIG. 8 and step 910 of FIG. 9 may be forwarding the packet directly to the opposite network interface, be it the device interface 502 or the network interface 504, or may entail forwarding the packet to one of the security modules, 512, 514 and 516 for further processing prior to forwarding the packet out of the node. If the packet fails any of the checks performed by the security modules the packet may be discarded.

Figure 10:
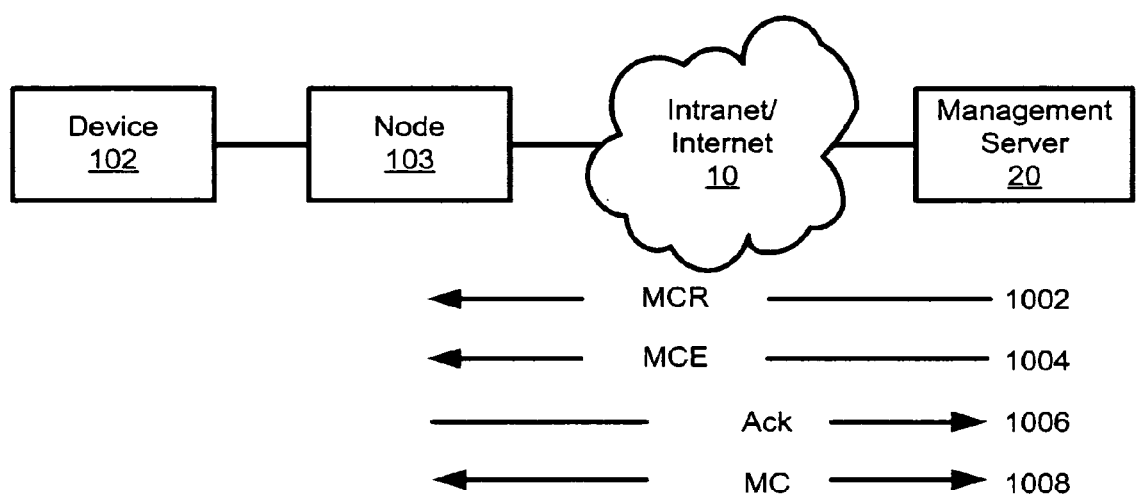
FIG. 10 illustrates an initialization phase message flow.

FIG. 10 shows the messaging flow between the security node 103 and the management server 20 during the initialization phase. When the node 103 is in place, powered on and has intercepted a management connection request (MCR) packet 1002 the initialization phase begins. With the basic device information gathered, the node awaits an MCR trigger from the management server 20. The MCR is a connectionless type packet such as a User Datagram Protocol (UDP) packet that contains encrypted information about the management server 20, desired management server settings, and connection timing. Addressing of the MCR packet is to one of the endpoint devices behind node, but with a port number that is not used by the endpoint device. When received by the security node 103, step 1002, the MCR is trapped, removed from the network 10 and the encryption checked. The encryption is specific for the location where the node is deployed, and the network setup that the endpoint device is deployed in. The node 103 will attempt to decrypt and confirm the MCR packet (refer to FIGS. 11 and 12 for details). The MCR contains IP addresses, port numbers, encryption types, and timing that can be used to establish a management server connection. Once a valid MCR has been received and authenticated, the node moves into a management server connection setup mode 1004 and responds to the server with a connection acknowledgement 1006. A secure bi-directional connection 1008 is then established between node 103 and management server 20. The security node 103 and the management server 20 can then exchange information in a secure manner.

A connection oriented protocol such as TCP (transmission control protocol) connection interception mechanism is setup to receive only traffic that is from the management server IP address and source port specified in the MCR and is directed to the target IP address and destination port specified in the MCR. This connection interception system passes the connection traffic to a piece of control software running on the security node and establishes an encrypted connection such as for example an secure socket layer (SSL) connection with the management server 20.

Figure 11:
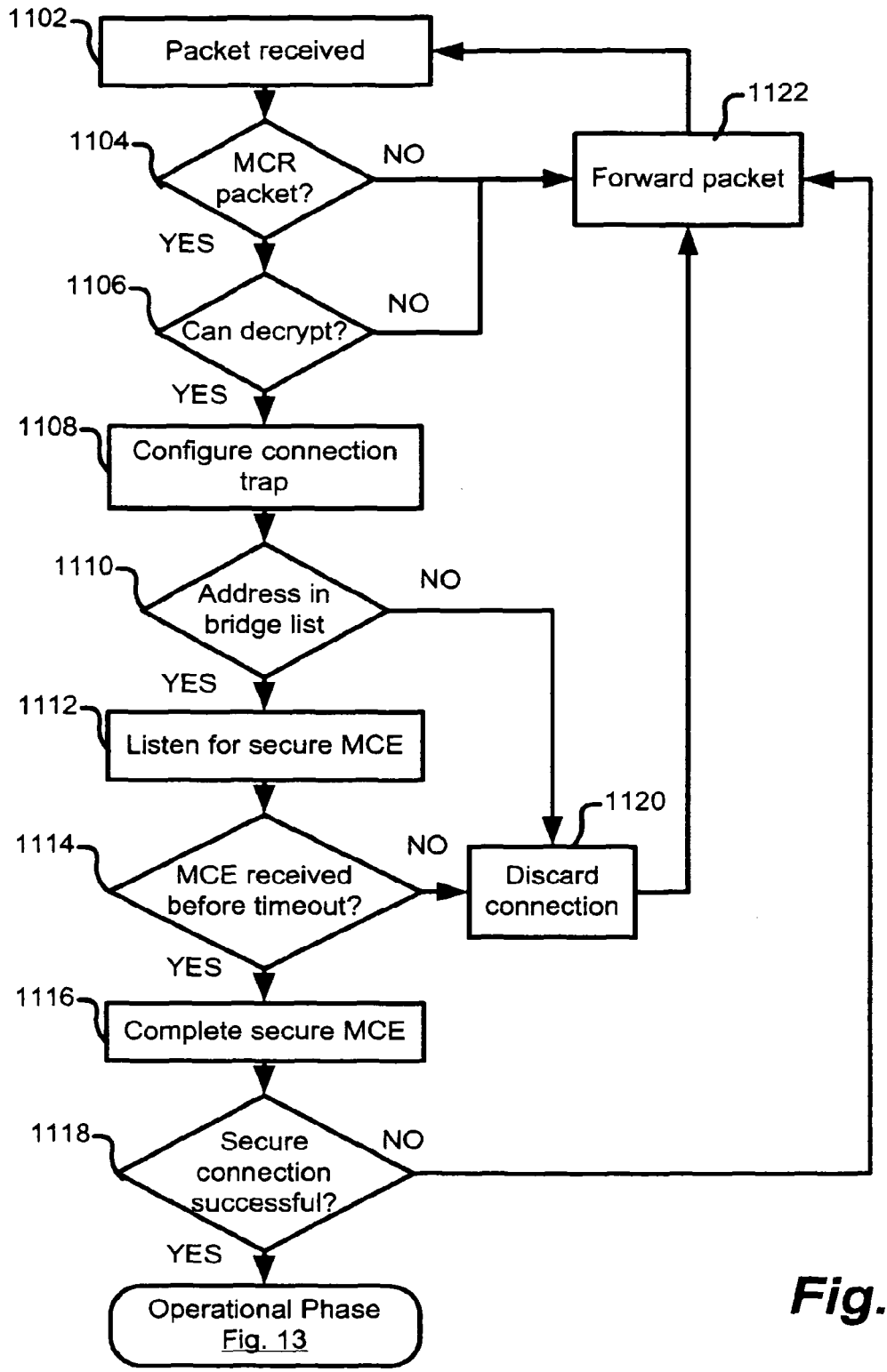
FIG. 11 illustrates a method of the initialization phase in the security appliance.
Figure 12:
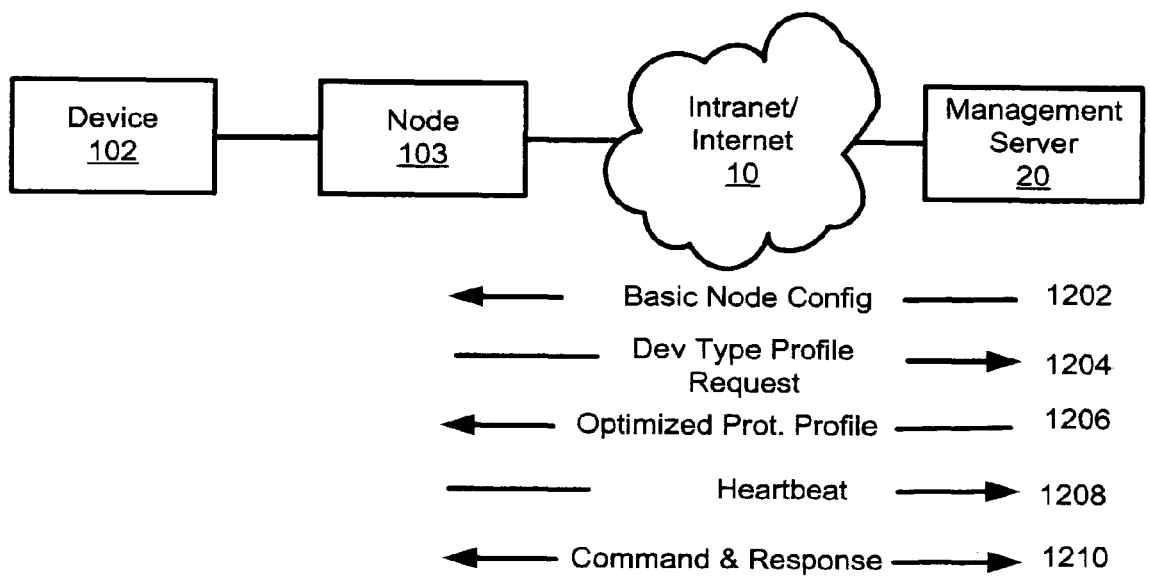
FIG. 12 illustrates an operational phase message flow.

FIG. 11 is a method diagram of the initialization phase for the security node 103. FIG. 12 shows the messaging flow between the security node 103 and the management server 20 during the operation phase. The security node 103 intercepts a packet that might be on the network 10 regardless of its destination address at step 1102. The packet is analyzed at step 1104 to determine if it is an MCR packet. If the packet does not contain MCR information (NO at step 1104) it is forwarded on at step 1122. If the packet does contain MCR information (YES at step 1104), the encryption of the packet is checked to determine if the packet can be decrypted 1106. If the MCR packet is able to be decrypted (YES at 1106) then a management communications link trap is prepared 1108. If the decryption failed (NO at step 1106), the packet is released for forwarding at step 1122.

At step 1110 an encrypted destination IP address in the connection request is checked against a bridge table in the database module 511 for the security node to determine if it belongs to a device downstream of the security node. If the IP address verifies correctly (YES at 1110), the security node begins listening for a secure management connection (MCE) 1112. If the IP address proves invalid (NO at step 1110), the connection trap (established in step 1108) is discarded and reset 1120 and the packet is forwarded at step 1122. A node will only listen for a secure management server connection for a period of time, effectively limiting the time in which the management server 20 can connect to the node 103 (i.e., time-out management). If a secure management connection does not start within that period of time, while the node 103 is listening at step 1112, the connection trap is discarded and reset (NO at step 1114). If a connection request is received before the timeout (YES at step 1114) then the security of the connection is checked and completed at step 1116. If the connection is successfully completed (YES at step 1118) then the security device 103 enters the operational phase. If the connection is not successful (NO at 1118) the packet is forwarded. It should be noted that depending on the construction of the MCR and MCE packets, the packets may be discarded as opposed to being forwarded if the packets do not contain payload information, or any information relevant to an endpoint device. If the MCR and MCE information is embedded in a packet and the process fails, or is successful, the information can be stripped from the packet prior to forwarding to the endpoint device. The MCE connection once established is a secure encrypted link. Security maintenance of the connection is done be setting the level of revalidation of the digital certificates.

FIG. 12 is a flow diagram of the operational phase of the security node 103. Once the management connection is established, the node 103 is in an operational phase. The management server 20 will upload a basic node configuration at 1202 to the node 103, which defines the software modules, basic configuration and heartbeat settings to be used by the node 103 (refer to FIG. 5). When a new endpoint device's type is determined by the node 103, it can send a device security profile request 1204 for that device 102 via the secure management server connection. The device type profile is based upon the learned attributes of the protected devices for the learning mode. When the management server 20 receives a device security profile request, it looks up the device type in the management server's device database. A security profile is generated for the device and added to the security node's existing security profile(s) as recorded on the management server 20. The new node security profile can then be optimized and downloaded to the node 1206. If the node 103 (or a software module 512, 514 and 516) needs attention or is periodically required to report in the heartbeat module can be triggered to send a heartbeat message 1208 to the management server 20. The heartbeat message 1208 contains a request for management server attention and the reason for the request. When the management server 20 receives one of these heartbeat request packets (via the heartbeat logger 612 and monitor 614) it can chose to service the request or delay servicing depending on the reason for the request and current user preference settings on the management server 20. Servicing of the request involves establishing a management server connection with the node 103 (if one is not already active) and taking appropriate command action in the form of command and responses 1210. Commands and response communication can also be used to reconfigure the deployable software modules 512, 514 and 516 on the node 103 or deploy new ones. Communication between the security node and management server may occur by a persistent connection or be initiated on a message by message basis.

During the waiting time prior to management server connection establishment, the node 103 can use established passive fingerprinting techniques (such as those used in open source software products such as, "xprobe" and "p0f") to identify what devices will likely need to be protected in connection with the learning procedure descried in connection with FIG. 8. This fingerprinting continues even after configuration by a management server in order to detect new devices added to the network being protected.

Figure 13:
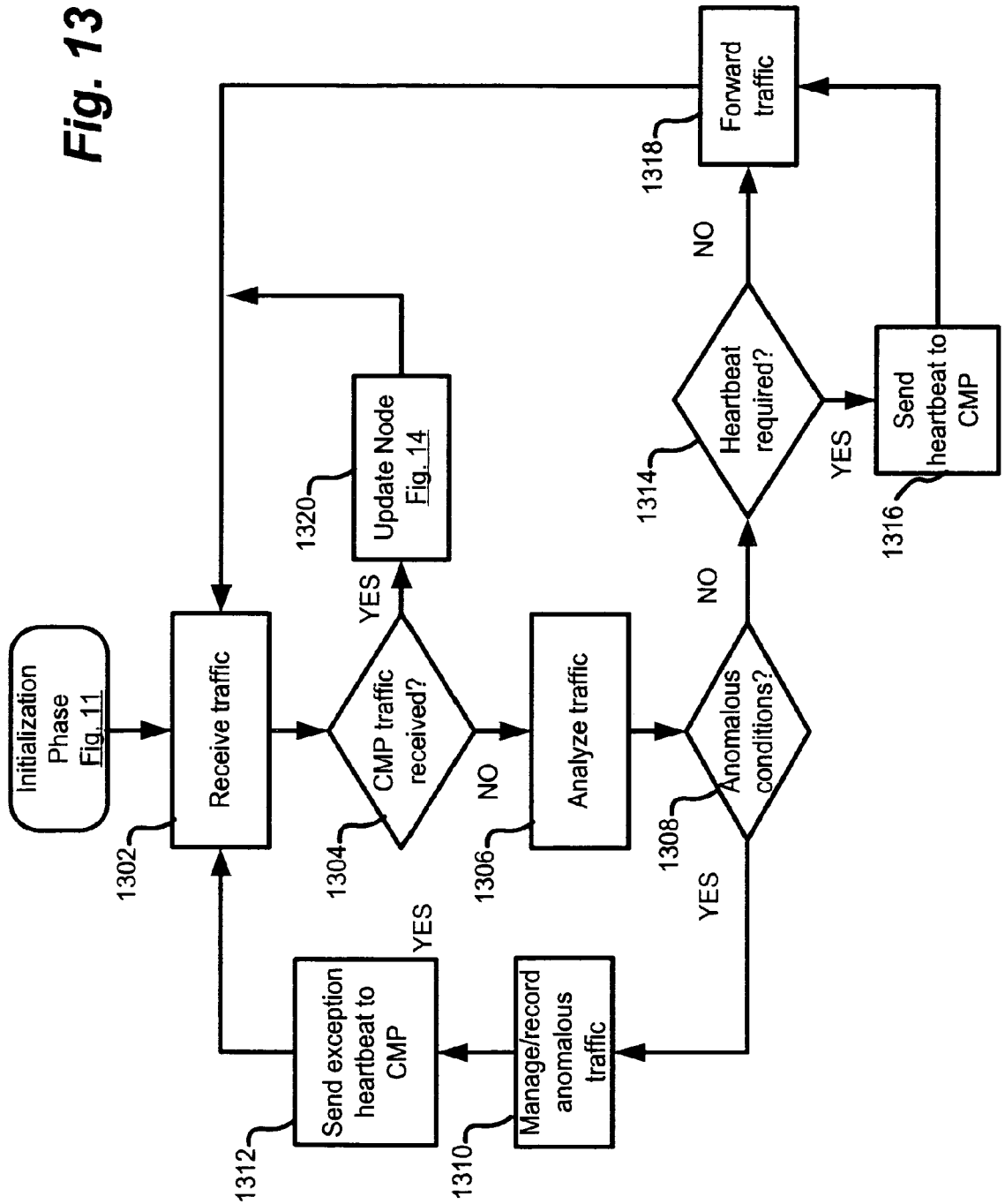
FIG. 13 illustrates a method of the security node processing traffic in the operational phase.

FIG. 13 is a flow diagram of the security node processing traffic in the operational phase. From the initialization phase (FIG. 11) the security node now enters the operational phase. Traffic is received at the device interface 502 or network interface 504 of the security node at step 1302. The traffic is inspected at step 1304 to split off CMP related traffic from non-CMP related traffic. Packets from CMP communication streams are identified using standard TCP stream tracking techniques as well as packet sequencing decrypted CMP packets. The CMP message is an embedded packet directed to the security node that requires the security node to perform an update. If CMP traffic is identified (YES at 1304) the node is updated or a command performed as defined in the CMP message at step 1320, as will be discussed in connection with FIG. 14. If CMP traffic is not identified (NO at step 1304) the packet is then managed utilizing security modules 512, 514 and 516 at step 1306. If it is identified that an anomalous condition exists with the packet (YES at step 1308) by one of the security modules, for example the packet is addressed to a port that is closed for the particular device or the packet contains a malicious command, the traffic is dealt with at step 1310 based upon the defined management rules for the respective security module. Details concerning the packet may also be logged for further analysis at this stage. The heartbeat module then sends an exception heartbeat at step 1312 to the management server 20 identifying that an event has occurred. The heartbeat message may occur for each event or be triggered after a defined number of events has occurred.

The communication between the security node (network security appliance) to the management server operates on principles of "heartbeat" signaling and "report by exception". Heartbeat signaling is used to send the current status condition of the node to the management server. The report by exception communication is used to signal exception conditions occurring on a node to the management server. Both principles of node to management server communication can be secured using encryption.

If the traffic passes the security modules and no anomalous traffic is detected (NO at step 1308) a check to determine if a periodic heartbeat is to be sent to the management server may occur at step 1314. If a heartbeat is required (YES at step 1314) it is sent at step 1316 and the packet is forwarded to the appropriate interface at step 1318. If a heartbeat message is not required, (NO at step 1314) the packet is forwarded to the appropriate interface and the security node continues monitoring incoming traffic 1302.

Figure 14:
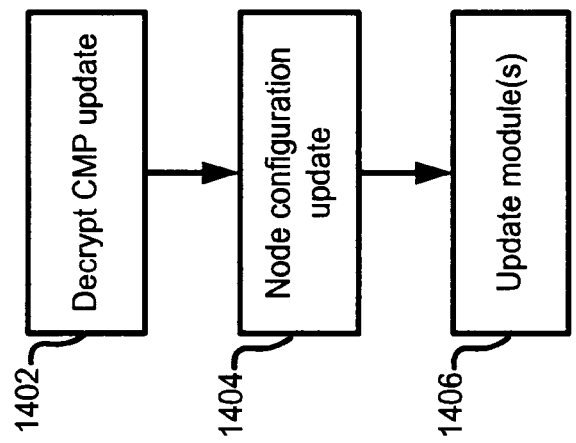
FIG. 14 illustrates a method of the security node update procedure.

FIG. 14 is flow diagram of the security node update procedure. If the security node receives a CMP message at step 1304 of FIG. 13, the packet is decrypted at step 1402. The payload of the packet may contain configuration information such as a security profile or software updates. The appropriate configuration changes are implemented in the security nodes at step 1404 and any updates of software modules 512, 514 and 516 are preformed at step 1406. Depending on the operation of the security node, additional steps may be performed such as a warm or cold restart of the node itself if required to implement software or firmware updates.

Figure 15:
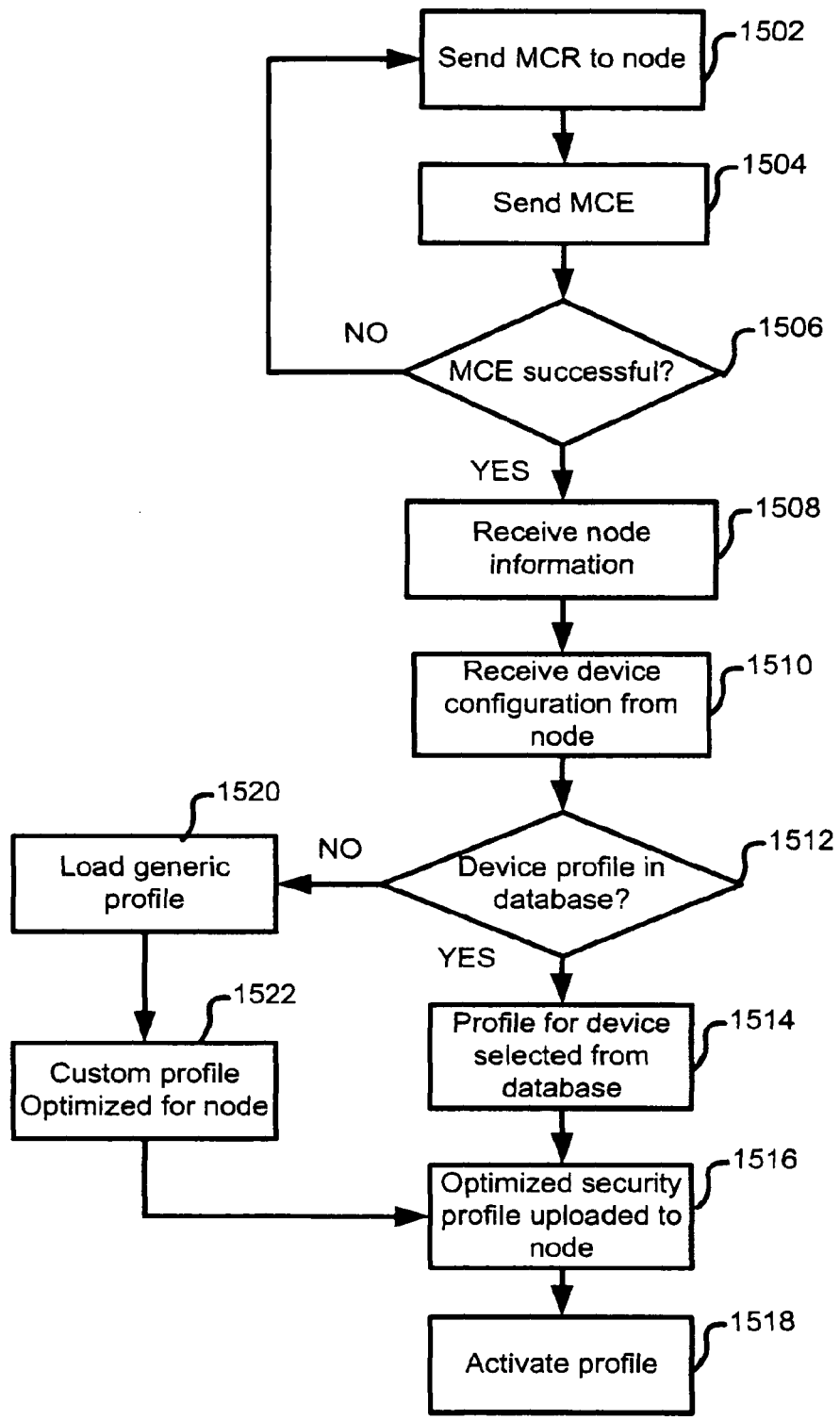
FIG. 15 illustrates a method of the management server establishing a connection with the security appliance.

FIG. 15 is a flow diagram of the management server 20 establishing a MCE connection with a security node. The management server sends an MCR message directed to a specific security node at step 1502 but using an address belonging to a device to be protected by the node. After a pre-defined period of time the MCE packets is sent at step 1504. If the connection is not successful (NO at step 1506) the management server 20 continues to send 1502 until a connection is established with the desired node or a predefined timer expires. If the MCE is successful, and the appropriate digital certificates and pass phrases are correct, the connection is accepted and a secure communication has been established with the security node, (YES at step 1506) node information is received at step 1508. The node will then transmit the device information that it has determined by monitoring traffic to endpoint devices at step 1510. The management server 20 can then determine the appropriate security profile for the device at step 1512. If security profile information is available (YES at 1512) the appropriate rules and software are retrieved from the management server 20 database at step 1514. If no device profile exists in the database (NO at step 1512) a generic profile is retrieved at step 1520 and a custom profile may be created at step 1522 based upon an analysis of the device information provided by the security node at step 1510. The profile is then sent to the security node as CMP traffic at step 1516 and activated at step 1518.

The uploading of profiles occurs when a security node is started but may also occur when an exception heartbeat is received at the management server 20 indicating that something has changed with the endpoint device or a new security threat has been detected.

There are thousands of different makes and models of industrial control devices on the market, each communicating using one or more of the over 350 known SCADA communications protocols. Each control device needs very specific security rules to be protected correctly. For example, one popular PLC (example of an endpoint device) has an unusual, but known security issue with web requests that contain URLs longer than 125 characters. Another PLC stops all communications if it receives a MODBUS diagnostic message with an Option Code of 4 and requires a power reset to recover. Manually creating rules to address these issues in a traditional firewall requires extensive knowledge of both control product flaws and how to create custom firewall rule sets. It also can cause the overall firewall configuration to be exceedingly complex and increase the chance of serious errors in the configuration.

Specific device rule templates are provided on the management server in the database subsystem 610 that are developed for common control products. An example of such a template for the second PLC noted above could be device specific vulnerability protection rules such as:

Deny MODBUS diagnostic messages with option code of 4 from all addresses
Deny HTTP messages from all addresses
Deny VxWorks™ manufacturer developer port messages from all addresses Device specific traffic control rules can be provided such as:

Allow MODBUS firmware load message from PLC programming station
Deny MODBUS firmware load message from all other addresses
Allow MODBUS read messages from operation station
Deny MODBUS read message from all other addresses
Deny all other MODBUS messages from all addresses The rule set would be loaded automatically to the security node based on the device discovery process described earlier. Multiple rule sets are combined and optimized in the invention using well known techniques commonly used in software language compliers, but are unknown in the security appliance field. User confirmation (if required) could be either in a text form or in a graphical form where the user clicks on the recommended rules in the template and drags icons of allowed devices to adjust the rules for specific addresses.

As described above, instead of a security manager 20 creating rule sets for a security node and uploading them, a rule set can be created automatically according to the endpoint device to be protected. Rule sets are designed with the needs of the endpoint device to be protected in mind, not with the design of the node in mind. For example, the node learns the make of the PLC or RTU (examples of an endpoint device) that needs to be protected and informs a management station. The management station then does a database lookup and recommends the appropriate firewall or IDS (intrusion detection system) templates required to protect that device. A security manager then decides if these rules meet their needs, modifies them accordingly and deploys them to the field (this also applies when the node is protecting multiple different endpoint devices). To an operator, it will appear that the rules are being sent directly to the device and there appears to be no node/firewall involved. This reduces the complexity of the rules and directs focus to protecting the devices (e.g., PLC, RTU, etc.) from unwanted traffic. The rule sets can also be created prior to the deployment of the node in the field, so that the device automatically acquires its configuration on power-up.

Figure 16:
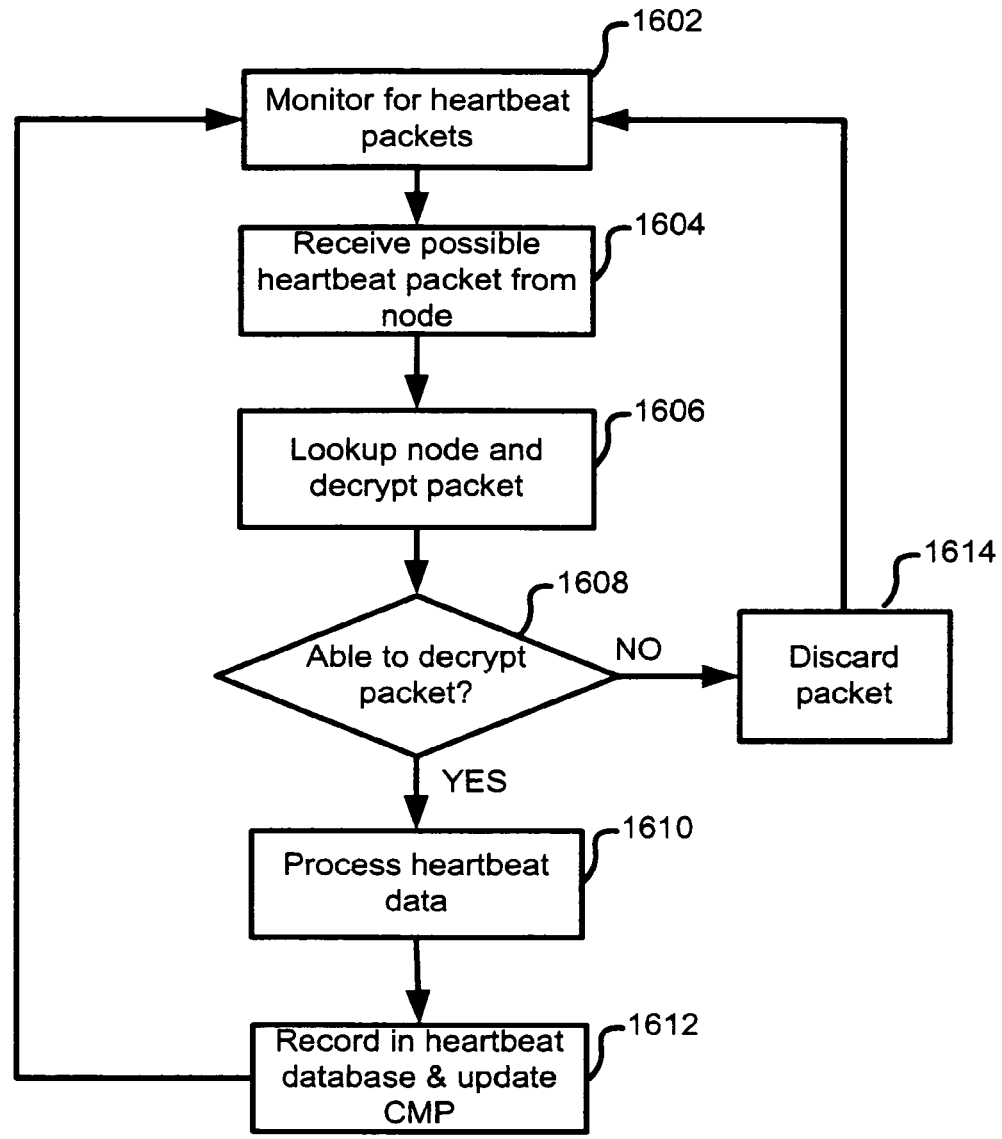
FIG. 16 illustrates a method of the management server monitoring received traffic for heartbeat data packets.

FIG. 16 is a flow diagram of the management server 20 monitoring received traffic for heartbeat data packets. The heartbeat logger 612 monitors traffic incoming to the management server 20 at step 1602. If a heartbeat packet is received at step 1604, a node lookup is performed and the packet is decrypted at step 1606. If the packet cannot be decrypted (NO at step 1608) it is discarded. If the packet can be decrypted (YES at step 1608) the heartbeat payload is processed to determine that state of the security node and if any anomalous conditions are being reported at step 1612. If there is a condition identified that requires a change to the security policy, an existing MCE is utilized, or a new one is established to send an updated profile to the security node.

Examples of suitable computing system environments or configurations that may be suitable for implementing various embodiments include: a general purpose personal computer (PC); a hand-held or laptop computer; multi-processor based systems; microprocessor based systems; programmable consumer electronics; network computers, minicomputers, mainframe computers; distributed computing environments; industrial process equipment; industrial control equipment (such as PLCs, RTUs, IEDs, DCS) and medical devices and the like.

Components of a typical computing device include, but are not limited to, a processing unit, an input/output interface, a system memory, and a system bus. The system bus communicatively connects the aforementioned components and numerous other cooperatively interactive components. The input/output interface interacts with external components through an input/output unit (which can include keyboard, mouse-type controllers, monitors, media readers/writers and the like). The system memory instantiates various components and operations of the network security appliance according to embodiments of the present invention.

The detailed description does not limit the implementation of the embodiments of the present invention to any particular computer programming language. The computer program product may be implemented in many computer programming languages provided that the OS (Operating System) provides the facilities that may support the requirements of the computer program product. An exemplary embodiment of the present invention can be implemented in the C or C++ computer programming language, or may be implemented in any other mix of supported programming languages. Any limitations presented would be a result of a particular type of operating system, computer programming language, or database management system and would not be a limitation of the embodiments of the present invention described herein.

The embodiments of the invention described above are intended to be illustrative only. The scope of the invention is therefore intended to be limited solely by the scope of the appended claims.

What is claimed:

1. A method comprising:
   receiving, at a security device, encrypted configuration data from a management server connected to a data network, from packets addressed to a networked device;
   managing, by the security device, packets between the networked device and other devices accessible through a network based upon the configuration data; and
   sending, by the security device, a plurality of encrypted heartbeat messages to the management server utilizing an address associated with the networked device as the originating address for packets in which the encrypted heartbeat messages are transmitted.

2. The method of claim 1, further comprising:
   receiving, at the security device, encrypted management connection data originating from the management server, from packets addressed to the networked device; and
   sending, to the management server, device attributes associated with the networked device, utilizing the address associated with the networked device as the originating address for a packet in which the device attributes are transmitted,
   wherein the configuration data is selected by the management server based upon the device attributes.

3. The method of claim 1, wherein the security device is external to the networked device, and wherein the method further comprises positioning the security device between the management server and the networked device within the data network.

4. The method of claim 1, wherein the security device is configured to be integrated within the networked device.

5. The method of claim 1, wherein the security device is configured to be integrated within a traffic forwarding device.

6. The method of claim 1, wherein a packet address of packets transmitted by the security device further includes a TCP or UDP port number not utilized by the networked device.

7. The method of claim 1, wherein the security device utilizes both layer 2 and layer 3 addresses of the networked device when sending data to the management server.

8. The method of claim 1, wherein the heartbeat is generated for exception events based upon the managing of the packets.

9. The method of claim 1, wherein the configuration data is selected from a group comprising a firewall module, a device identification module, a virtual private networking (VPN) module, an intrusion detection module, a network statistics gathering module and a bandwidth monitoring and traffic shaping module.

10. The method of claim 1, wherein the configuration data comprises security rules associated with a control protocol used by the networked device.

11. The method of claim 1, further comprising determining the device attributes by monitoring traffic between the networked device and other devices accessible through the data network.

12. A device comprising:
    a processor;
    a communications module executable by the processor for receiving encrypted configuration data from a management server connected to a data network, from packets addressed to one or more networked devices;
    a heartbeat module executable by the processor for transmitting a packet providing a status signal to the management server, utilizing an address associated with one of the one or more networked devices as an originating address for the packet; and
    one or more security modules executable by the processor, the one or more security modules managing data transmitted between the one or more networked devices and other devices on the network based upon one or more security profiles in the configuration data associated with the one or more networked devices.

13. The device of claim 12, wherein the one or more security modules are configurable using configuration data received from the management server, wherein the configuration data comprises the one or more security profiles, and wherein the one or more security profiles are based on device attributes associated with the one or more networked devices.

14. The device of claim 12, wherein the device is configured to be positioned between the management server and the one or more networked devices within the data network.

15. The device of claim 14, wherein the device is configured to be integrated within a traffic forwarding device.

16. The device of claim 15, wherein the traffic forwarding device comprises a switch, a router, or a hub.

17. The device of claim 12, wherein the device is configured to be integrated within one of the one or more networked devices.

18. The device of claim 12, wherein the one or more security modules are selected from a group comprising a firewall module, a device identification module, a virtual private networking (VPN) module, an intrusion detection module, a network statistics gathering module and a bandwidth monitoring and traffic shaping module.

19. The device of claim 12, wherein the heartbeat module generates an exception status signal and a timed status signal, the exception status signal generated when an anomalous event is identified by the one or more security modules.

20. The device of claim 12, wherein the communications module is configured to receive encrypted packets addressed with an IP address and a predefined port number of one of the networked devices and to process the encrypted packets.

21. A system comprising:
a plurality of nodes, each node of the plurality of nodes associated with one or more of a plurality of networked devices, wherein each node receives encrypted configuration data from a management server from packets addressed to the one or more of the plurality of networked devices, and transparently bridges the one or more associated networked devices to a network and provides management of data communications traversing to and from the one or more associated networked devices and other devices in the network based upon security profiles in the configuration data associated with attributes of the one or more associated networked devices;
wherein the plurality of nodes are configured to communicate with the management server by utilizing an address of one of the associated networked devices, and wherein the plurality of nodes are configured to send a status message to the management server utilizing address information of an associated networked device as an originating address of the status message.

22. The system of claim 21, further comprising the management server, wherein the management server is configured to provide the security profiles to the nodes that are associated with the networked devices with which the security profiles are associated.

23. The system of claim 22, wherein the management server is configured to provide configuration data to each of the plurality of nodes based upon one or more identified characteristics of the one or more associated networked devices, and wherein the configuration data is associated with a control protocol utilized by the one or more associated networked devices and is configured based on the associated security vulnerabilities of the one or more associated networked devices.

24. The system of claim 21, wherein one or more of the plurality of nodes are configured to be positioned between the management server and the one or more networked devices within the data network.

25. The system of claim 24, wherein one or more of the plurality of nodes are configured to be integrated within a traffic forwarding device.

26. The system of claim 21, wherein one or more of the plurality of nodes are configured to be integrated within one of the one or more associated networked devices.

* * * * *